(12) United States Patent
Chen

(10) Patent No.: US 12,253,716 B1
(45) Date of Patent: Mar. 18, 2025

(54) PHOTONIC CIRCUITS WITH SELECTABLE NUMBER OF INPUT PORTS

(71) Applicant: Acacia Communications, Inc., Maynard, MA (US)

(72) Inventor: Long Chen, Marlboro, NJ (US)

( * ) Notice: Subject to any disclaimer, the term of this patent is extended or adjusted under 35 U.S.C. 154(b) by 0 days.

(21) Appl. No.: 16/915,315

(22) Filed: Jun. 29, 2020

Related U.S. Application Data

(60) Provisional application No. 62/915,377, filed on Oct. 15, 2019.

(51) Int. Cl.
*G02B 6/125* (2006.01)
*G02B 6/12* (2006.01)

(52) U.S. Cl.
CPC ........ G02B 6/125 (2013.01); *G02B 2006/121* (2013.01); *G02B 2006/12121* (2013.01); *G02B 2006/1215* (2013.01)

(58) Field of Classification Search
CPC ...................................................... G02B 6/125
See application file for complete search history.

(56) References Cited

U.S. PATENT DOCUMENTS

| | | | | | |
|---|---|---|---|---|---|
| 5,684,899 | A | * | 11/1997 | Ota | G02B 6/12007 385/14 |
| 5,770,472 | A | * | 6/1998 | Zhou | H01Q 3/2676 438/34 |
| 6,185,345 | B1 | * | 2/2001 | Singh | G02B 6/12007 385/24 |
| 2002/0048289 | A1 | * | 4/2002 | Atanackovic | B82Y 20/00 372/20 |
| 2009/0304332 | A1 | * | 12/2009 | Schweiker | G02B 6/125 385/39 |
| 2010/0060972 | A1 | * | 3/2010 | Kucharski | H04B 10/541 359/290 |
| 2011/0158576 | A1 | * | 6/2011 | Kissa | G02F 1/225 385/3 |
| 2011/0229075 | A1 | * | 9/2011 | Watanabe | G02B 6/125 156/60 |
| 2012/0224802 | A1 | * | 9/2012 | Zheng | B41J 2/46 385/14 |
| 2013/0094801 | A1 | * | 4/2013 | Morris | G02B 6/3672 427/163.2 |
| 2015/0036964 | A1 | * | 2/2015 | Okano | G02B 6/125 385/14 |
| 2015/0155945 | A1 | * | 6/2015 | Urino | H04B 10/032 398/17 |
| 2016/0054529 | A1 | * | 2/2016 | Yashiki | H01S 5/0064 385/2 |
| 2016/0164251 | A1 | * | 6/2016 | Yashiki | G02B 6/4204 385/2 |

* cited by examiner

*Primary Examiner* — Chad H Smith
(74) *Attorney, Agent, or Firm* — K&L GATES LLP

(57) ABSTRACT

In one aspect, the disclosure relates to an apparatus including a photonic integrated circuit (PIC) including an optical network including V optical output channels and U optical input ports, wherein a selectable subset of the U optical input ports can be connected to L lasers, wherein L is less than or equal to U, and wherein the PIC is operable to output light on some or all of the V optical output channels in response to different number of active lasers connected to the U optical input ports.

20 Claims, 4 Drawing Sheets

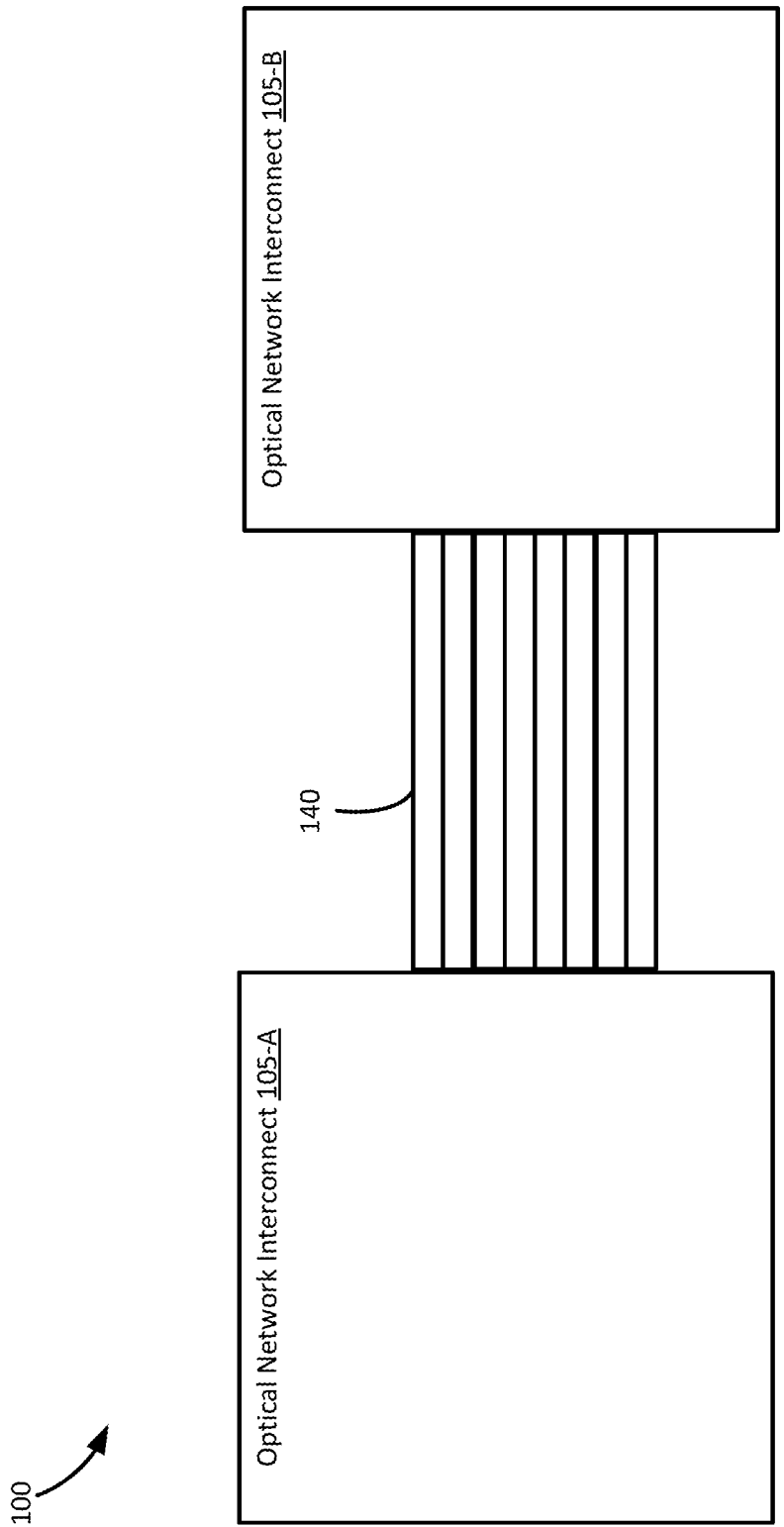

PHOTONIC CIRCUITS WITH SELECTABLE NUMBER OF INPUT PORTS

RELATED APPLICATIONS

This application claims priority to U.S. Provisional Application Ser. No. 62/915,377, filed on Oct. 15, 2019 and entitled "PHOTONIC CIRCUITS WITH SELECTABLE NUMBER OF INPUT PORTS," which is incorporated by reference in its entirety.

FIELD

This disclosure relates generally to the field of photonic circuits such as photonic integrated circuits (PICs).

BACKGROUND

Contemporary optical communications and other photonic systems make extensive use of photonic integrated circuits (PICs) that are advantageously mass-produced in various configurations for various purposes.

SUMMARY

In part, in one aspect, the disclosure relates to an apparatus that includes a photonic circuit that in turn includes multiple output channels, and various input ports that can be used with one or more laser sources. The apparatus is operable to support one or more lasers, such as a first, a second, a third, a fourth, etc. laser based on a given user or use case selection of laser number whilst using the same photonic circuit. Thus, the optical paths traced within the PIC may vary when one laser is used with the PIC with one input port and two or more lasers used with different input ports. The photonic circuit may include multiple optical paths connecting one or more input ports with one or more of the multiple output channels. Additionally, various optical elements, for example, such as splitters, circulators, or optical signal distributors may be used. A given optical element may be active or passive.

In one aspect, the disclosure relates to an apparatus including a photonic integrated circuit (PIC) including an optical network including V optical output channels and U optical input ports, wherein a selectable subset of the U optical input ports can be connected to L lasers, wherein L is less than or equal to U, and wherein the PIC is operable to output light on some or all of the V optical output channels in response to different number of active lasers connected to the U optical input ports.

In one embodiment, the apparatus further comprises wherein the optical network comprises W optical elements, wherein each of the W optical elements comprises at least two optical output channels, wherein each of the U optical input ports is in optical communication with at least two of the V optical output channels, wherein V is greater than U. In one embodiment, the apparatus further comprises wherein the W optical elements are optical signal distributors selected from a group consisting of optical splitter, active optical splitter, passive optical splitter, optical coupler, optical multiplex, and optical circulator.

In one embodiment, the apparatus further comprises wherein the W optical elements comprise one or more groups of optical splitters, the one or more groups of optical splitters optically connected in a y-shaped topology. In one embodiment, the apparatus further comprises wherein the W optical elements comprise a first optical element comprising a single optical input; a second optical element comprising two optical inputs; and third optical element comprising two optical inputs. In one embodiment, the apparatus further comprises wherein the PIC further comprises a substrate, wherein each of the W optical elements are disposed thereon or therein the substrate. In one embodiment, the apparatus further comprises where V is 4, and L is 1 or 2. In one embodiment, the apparatus further comprises where V is 8, and L is 1, 2 or 4.

In one embodiment, the apparatus further comprises wherein the optical network comprises a plurality of 1×2 optical splitter and a plurality of 2×2 optical splitters. In one embodiment, the apparatus further comprises wherein the optical network comprises passive and/or active optical splitters. In one embodiment, the apparatus further comprises wherein the PIC comprises V modulators, wherein each of the V modulators is connected to one of the V output channels. In one embodiment, the apparatus further comprises one or more lasers, wherein each of the one or more lasers is connected to only one of the U optical input ports or channels. In one embodiment, the apparatus further comprises wherein U is 3 and V is 4. In one embodiment, the apparatus further comprises wherein U is 6 and V is 8.

In one aspect, the disclosure relates to a method of using an optical network that has V optical output channels, U optical input ports or channels, and a selectable subset of the U optical input ports can be connected to a variable number L of lasers to provide optical power to V optical output channels, the method including determining the number L of lasers to be used; select the subset of L optical input port from the U optical input ports that map the L lasers to the V output channels; and connect the L lasers to the L optical input ports. In one embodiment, the method further comprises modulating the optical signal after the optical network. In one embodiment, the method further comprises wherein the modulation format is amplitude modulation.

In one aspect, the disclosure relates to a method of managing optical signal transmission in a photonic integrated circuit (PIC) of an optical transmitter including receiving a first optical signal at a first optical input port of PIC at a first point in time or simultaneously receiving a second optical signal at a second optical input port of the PIC and a third optical signal at a third optical input port of the PIC at a second point in time; when receiving the first optical signal, splitting the first optical signal within the PIC a first time and then splitting the split first optical signal a second time to generate a doubly split optical signal; and when receiving the second optical signal and the third optical signal, splitting the second optical signal and the third optical signal within the PIC.

In one embodiment, the method further comprises modulating the doubly split optical signal according to a multiplexing scheme. In one embodiment, the method further comprises wherein the multiplexing scheme is pulse amplitude modulation (PAM). In one embodiment, the method further comprises transmitting the doubly split optical signal or a signal derived therefrom from four output ports of the PIC. In one embodiment, the method further comprises modulating the split second optical signal and the split third optical signal according to a multiplexing scheme. In one embodiment, the method further comprises wherein the multiplexing scheme is PAM.

In one embodiment, the method further comprises transmitting the split second optical signal and the split third optical signal or a signal respectfully derived therefrom from two pairs of output ports of the PIC. In one embodiment, the method further comprises wherein the PIC is constructed to be operable in a first state and a second state where each states uses a different subset of the plurality of input channels. In one embodiment, the method further comprises selecting a first laser for transmitting the first optical signal to the first optical input port in response to a user selected communication use case. In one embodiment, the method further comprises selecting a first laser for transmitting the second optical signal to the second optical input port and a second laser for transmitting the third optical signal to the third optical input port in response to a user selected communication use case. In one aspect, the disclosure relates to an apparatus including a photonic integrated circuit (PIC) comprising U optical input channels; V optical output channels; and W optical elements, wherein each of the W optical elements comprises at least two optical output ports, wherein each of the U input channels is in optical communication with at least two of the V output channels, wherein V is greater than U.

In one embodiment, the apparatus further comprises wherein U, V, and W are positive integers greater than 1. In one embodiment, the apparatus further comprises wherein the W optical elements comprise one or more groups of optical splitters, the one or more groups of optical splitters optically connected in a Y-shaped topology. In one embodiment, the apparatus further comprises wherein, U is 3 or 6 and V is 4 or 8. In one embodiment, the apparatus further comprises wherein the W optical elements comprise a 1×2 optical splitter and a plurality of 2×2 optical splitters. In one embodiment, the apparatus further comprises wherein the W optical elements are optical signal distributors selected from a group consisting of optical splitter, active optical splitter, passive optical splitter, optical coupler, optical multiplex, and optical circulator. In one embodiment, the apparatus further comprises wherein the PIC comprises V modulators, wherein each of the V modulators is in optical communication with one of the V output channels.

In one embodiment, the apparatus further comprises wherein each of the at least two optical output ports of each optical element are in optical communication with one of the V modulators. In one embodiment, the apparatus further comprises wherein the W optical elements comprise a first optical element comprising a single optical input; a second optical element comprising two optical inputs; and third optical element comprising two optical inputs. In one embodiment, the apparatus further comprises wherein the PIC further comprises a semiconductor substrate, wherein each of the W optical elements are disposed thereon or therein the substrate. In one embodiment, the apparatus further comprise one or more lasers, wherein each of the one or more lasers is in optical communication with only one of the U optical input channels or ports.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which:

FIG. 1 illustrates a high level component diagram of two interconnects in communication using fiber, in accordance with one or more aspects of the disclosure.

DETAILED DESCRIPTION

Figure 2A:
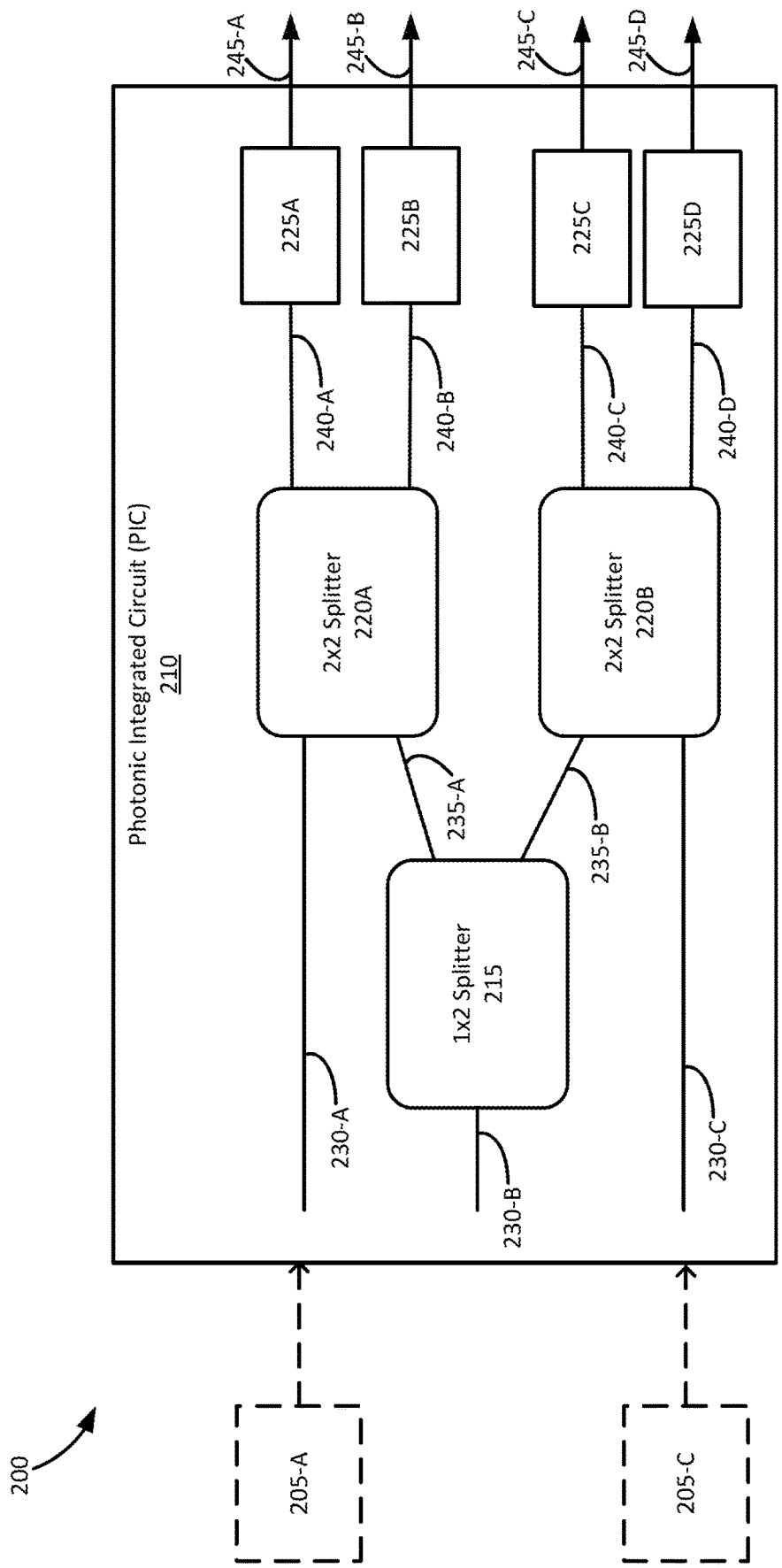
FIGS. 2A and 2B illustrate an implementation of a photonic circuit capable of operating in multiple configurations, in accordance with one or more aspects of the disclosure.

In many embodiments, the current disclosure may enable the design, creation, and/or implementation of a photonic circuit having the flexibility to function with different configurations of lasers to power multiple parallel channels or lanes of externally modulated transmitters. In various embodiments herein, channel and lane may be used interchangeably. In most embodiments, laser(s) may provide optical energy to an optical transmitter to create multiple output channels. In various embodiments, the optical energy may satisfy the power demands of a given link and compensate for optical losses such as from coupling, splitting, modulating, and routing light.

For example, in one embodiment, transmitters with four parallel channels can use four lasers (one for each channel), or share two lasers among the four channels, or share one laser among the four channels. In these embodiments, each channel may be able to provide one of a plurality of signaling levels within each channel. For example, in some embodiments, a 400G Ethernet connection may be converted at an optical interconnect using a DR4 PAM4 standard. In these embodiments, DR4 may mean there are four parallel channels while PAM4 may mean that within each channel it is using 4-levels of pulse amplitude modulation.

In various embodiments, it may be preferable to use as few lasers as possible, which may reduce a cost of the components and complexity of assembly. In other embodiments, the higher output power requirement when sharing the laser(s) may need to have a different tradeoff in laser price and/or electrical power consumption. In most embodiments, different laser input configurations may be adopted depending on various factors including system requirements, component performances, power, cost, etc.

Generally, each implementation of a photonic circuit transmitter (i.e., an optical engine without the laser(s)) is optimized for a specific laser input configuration (i.e., number of laser(s) to use). As a result, when one wants to change between for example using one laser or using two lasers for a 4-channel transmitter, typically a different photonic circuit is required, which adds to the development cost.

In various embodiments, the current disclosure may enable creation and/or design of an optical network, on a photonic circuit, in such a way that the photonic circuit has the desired number of output parallel ports and multiple input ports, where one may be able to use a subset of these input ports to enable different laser input configurations with the same photonic circuit. In most embodiments, an optical splitter may be named for its respective functions and purpose (e.g., a 1×2 splitter splits one signal into two lanes or channels; a 1×4 splitter splits one signal into 4 lanes or channels). In these example embodiments, each lane may be a parallel optical channel, and each channel may be connected to an optical modulator and an output port. In these embodiments, the splitters may have fixed and even splitting ratios, but can be made adjustable or non-even as well.

In various embodiments, a lane or channel may be an optical fiber, optical path, waveguide, and/or other equivalent medium. In certain embodiments, a splitter may not require each and every input port to be used. For example, in some embodiments, a 2×2 splitter may provide two lanes or channels while using one of the two input ports, while the other input port remains unused, functionally similar as a 1×2 splitter. In various embodiments, splitters may be passive splitters. In some embodiments, one or more splitters used within a photonic circuit may be an active splitter with one or more control elements to adjust the splitting ratio. In certain embodiments, various optical signal distributors/devices and/or components may include optical splitters, active optical splitters, passive optical splitters, optical couplers, optical multiplexers, and/or optical circulators.

In many embodiments, the disclosed network of splitters on a photonic circuit may include multiple tiers, layers, or levels of splitters. In some embodiments, the network may include various numbers of 1×2 splitters and 2×2 splitters. In other embodiments, the network may include other splitters such as 1×3, 1×4, 2×4 splitters, etc. In various embodiments, the output ports of the network may be the desired number of parallel channels, connected to optical paths such as modulators. In some embodiments, the input ports of the network may be selected and connected to laser(s). In various embodiments, some of the input ports may bypass certain levels of the splitters.

Refer now to the example embodiment of FIG. 1, which shows an example system, in accordance with one or more aspects of the disclosure. As shown, the system 100 includes optical interconnect 105-A and optical interconnect 105-B in communication using a fiber optic cable 140. As shown, each of the optical interconnects (105-A, 105-B, 105 generally) includes a photonic circuit and one or more lasers. A photonic circuit includes an optical network configured to receive optical signals from one or more of the lasers to provide an optical output signal that is sent across the fiber optic cable 140. In this embodiment, the signals sent across the fiber optic cable 140 are used to communicate between optical interconnect 105-A and optical interconnect 105-B. In various embodiments, system requirements, component performance levels, power, cost, and/or other factors may dictate how many lasers are used in each implementation.

Figure 2B:
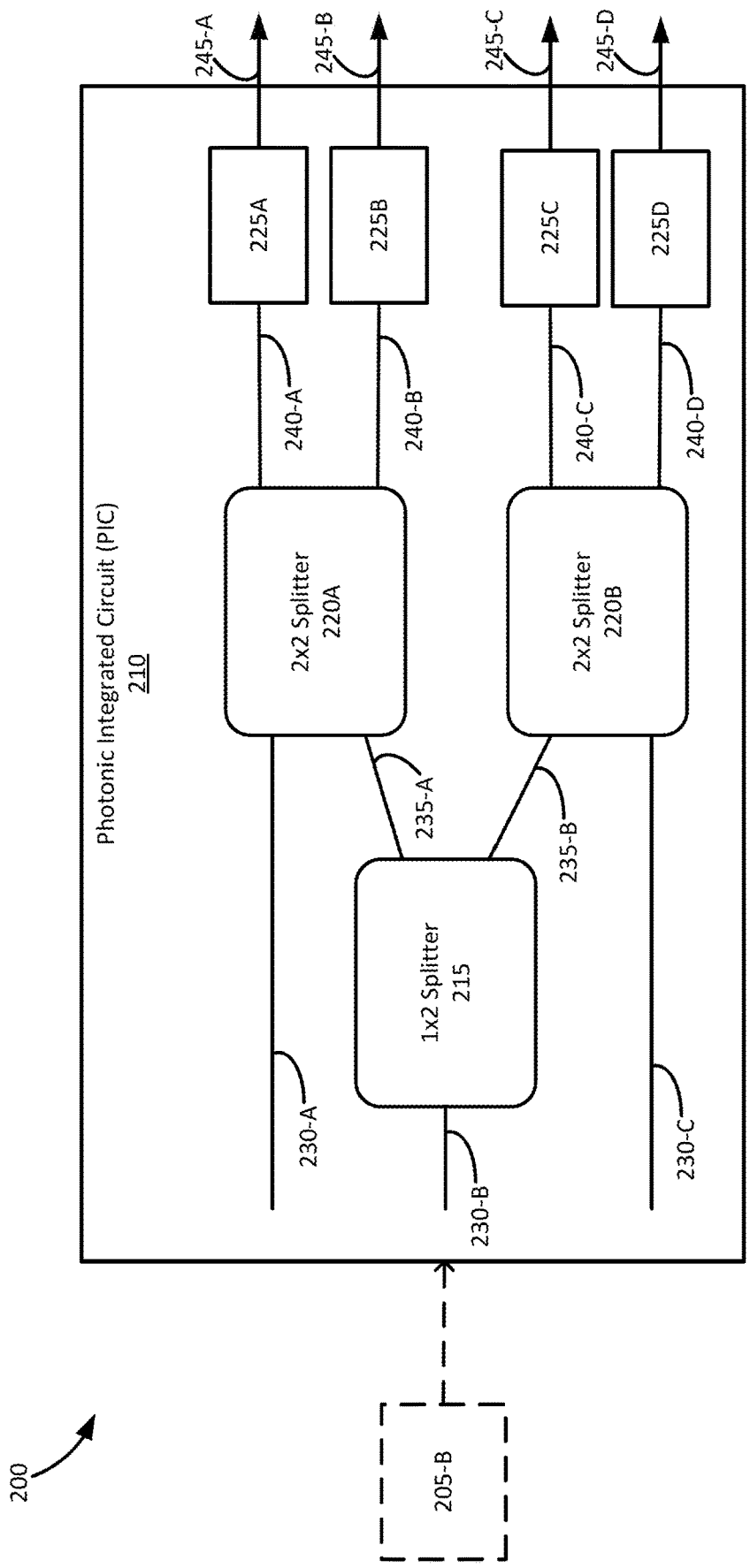

Refer now to the example embodiments of FIGS. 2A and 2B which shows a four parallel channels and a splitter network enabling the choice of using one laser or using two lasers with the same photonic integrated circuit (PIC), in accordance with one or more aspects of the disclosure. As shown, an optical network interconnect 200 includes a photonic circuit 210. The photonic circuit 210 is capable of creating four channels. In the embodiments of FIGS. 2A and 2B, the photonic circuit 210 includes an optical network comprising a single 1×2 splitter 215, two 2×2 splitters (220A/220B, 220 generally), and optionally, it may also include optical modulators (225A . . . D, 225 generally). Photonic circuit 210 is enabled to receive optical signals from laser(s) via input port(s) (230-A . . . C, 230 generally). Input port 230-A is connected to 2×2 splitter 220A, input port 230-B is connected to 1×2 splitter 215, and input port 230-C is connected to 2×2 splitter 220-B. 1×2 splitter 215 has output 235-A, which connects to 2×2 splitter 220-A, and output 235-B, which connects to 2×2 splitter 220-B. 2×2 splitter 220A includes output ports 240-A and 241-B, which connect to optical modulators 225-A and 225-B respectively.

Similarly, 2×2 splitter 220-B includes output ports 240-C and 240-D, which connect to optical modulators 225-C and 225-D respectively. Each of the optical modulators 225 output a modulated optical signal via channels (245-A . . . D, 245 generally). In most embodiments, the various connections can be implemented using waveguides. In FIGS. 2A and 2B, the line segments shown connecting optical elements define one or more optical paths between the various components. In this embodiment, as shown in both FIGS. 2A and 2B, the combination of splitters 215, 220 and channels 235 creates a y-shaped topology within the PIC.

FIG. 2A shows photonic circuit 210 in a first configuration where two lasers (laser 205-A and laser 205-C) are used to power the four channels 245. Specifically, laser 205-A provides a light source to photonic circuit 210 via input channel 230-A and laser 205-C provides a light source to photonic circuit 210 via input channel 230-C. In this configuration, input ports 230-B and optical path 235-A and 235-B remain unused during operation of the photonic circuit 210.

FIG. 2B shows photonic circuit 210 in a second configuration where one laser (laser 205-B) is used to power the four channels 245. Specifically, laser 205-B provides a light source to input port 230-B. The light is split by the 1×2 splitter 215 and routed to the 2×2 splitter 220A and 2×2 splitter 220B via optical paths 235-A and 235-B. As shown in FIG. 2B, laser 205-B needs to provide enough optical power (theoretically double of the dual-laser case 205-A/C) to mitigate the extra splitting loss.

As illustrated by the configurations shown in both FIGS. 2A and 2B, photonic circuit 210 can be fully operational using a single laser or in a dual laser configuration. In these embodiments the lasers 205-A/B/C are typical lasers used in optical communications. For example, they can be in the wavelength around 1310 nm or 1550 nm. Their wavelengths can be fixed or tunable. In this embodiment, the required laser output power depends specifically on the link requirements. As shown in FIGS. 2A and 2B, the required laser output power is in the range between 1 mW and 100 mW.

In various embodiments, the splitters may be formed in or disposed on the substrate of the photonic circuit. In these embodiments, the splitters may be formed in various waveguide platform, such as silicon, silicon oxide ($SiO_x$), doped silicon oxide, silicon-nitride, or InGaAsP, polymer etc. In some embodiments, the splitters may be implemented from directional couplers, Y-branch, adiabatic coupler, multimode interferometer, etc.

In various embodiments, one or more of the lasers suitable for use with the PIC may be formed of any suitable semiconductor material(s), which may include elemental semiconductors (such as silicon) and/or compound semiconductors (such as group III-V semiconductor materials). Some non-limiting examples include gallium arsenide (GaAs), gallium phosphide (GaP), indium phosphide (InP), indium gallium phosphide (InGaP), aluminum gallium arsenide (AlGaAs), gallium nitride (GaN), indium gallium arsenide (InGaAs), indium gallium arsenide nitride (GaInNAs), gallium indium phosphide (GaInP), and so forth. In various embodiments, one or more of the laser sources suitable for use with the photonic circuit may be integrated with the photonic circuit or separate from the photonic circuit.

The embodiments shown in FIG. 2A and FIG. 2B with four output channels and three selectable input ports can be expanded to support number V of output channels, with number U of selectable input ports, and a variable number L of lasers (L<U). In various embodiments, the values for V, U, and L may be increased without limitation to scale a given photonic circuit design for higher channel count and other performance features. In various embodiments, C channels and/or lanes may be used with R modulators. In various embodiments, the value of C and R may be the same. C and R may range from 2 to 128 in some embodiments. In other embodiments, C and R are greater than or equal to 4. In other embodiments, C and R are greater than or equal to 8.

In various embodiments, a given photonic circuit may include W optical elements, wherein U, V, and W are integers greater than 1. For example, in FIG. 2A, U=3, which includes channels 230, V=4, which includes channels 245, and W=3, which includes splitter 215, and two splitters 220. There are also V optical modulators 225, wherein V is 4. In some embodiments, the number of lasers and the optical ports to which they connect is less than the number of output ports, such as ports 245A-245D.

Figure 3:
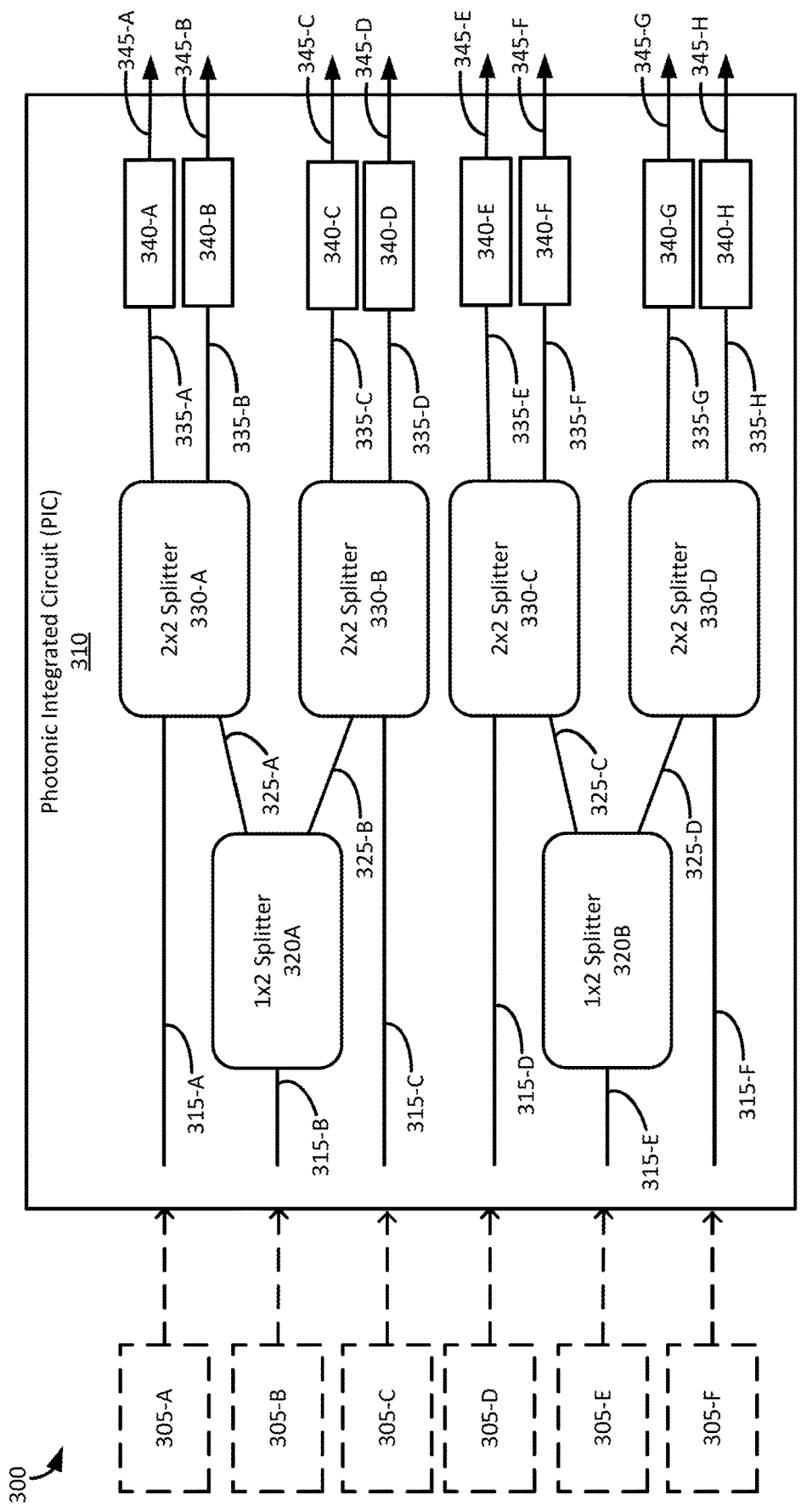
FIG. 3 illustrates another implementation of a photonic circuit capable of operating in multiple configurations with increased bandwidth options, in accordance with one or more aspects of the disclosure.

Refer now to the example embodiment of FIG. 3. FIG. 3 illustrates a photonic circuit implementing eight output channels (V=8), six input ports (U=6), and with either two or four lasers (L=2 or 4), in accordance with one or more aspects of the disclosure. As shown, the optical network interconnect 300 includes photonic circuit 310. Photonic circuit 310 includes an optical network which includes 1×2 splitters 320A and 320B, 2×2 splitters (330A . . . D, 330 generally), and optionally, optical modulators (340-A . . . H, 340 generally). Photonic circuit 310 is enabled to receive optical signals from input ports (315-A . . . F, 315 generally). As shown, photonic circuit 310 includes U optical input channels, V optical output channels, and W optical elements, which in this instance, U=6, V=8, and W=14. For example, the U optical input channels includes input channels 315, the V optical output channels include channels (345-A . . . H, 345 generally), and W optical elements includes splitters 320, splitters 330.

In addition, there are also V optical modulators 340, wherein V is 8. In this embodiment, 1×2 splitter 320A is capable of splitting optical signals received via input port 315B into path 325-A and path 325-B. Path 325-A is connected to 2×2 splitter 330-A and path 325-B is connected to 2×2 splitter 330-B. Similarly, 1×2 splitter 320B is capable of splitting an optical signal received via input port 315-E into path 325-C and path 325-D. Path 325-C is connected to 2×2 Splitter 330-C and path 325-D is connected to 2×2 splitter 330-D. Additionally, 2×2 splitter 330-A is connected to input port 315-A, 2×2 splitter 330-B is connected to input port 315-C, 2×2 splitter 330-C is connected to input port 315-D, and 2×2 splitter 330-D is connected to input port 315-F. Each of the 2×2 splitters 330 split received optical signals into output channels 335, which are directed toward each respective optical modulator 340. Once optical signals from each output channel 335 is modulated at the optical modulators 340, each respective optical modulator 340 outputs modulated optical signals via channels 345.

In this embodiment, photonic circuit 310 is capable of being powered and fully operational when receiving optical signals from a subset of lasers (305-A . . . F, 305 generally). For example, in one embodiment, photonic circuit 310 can be implemented using lasers 305-A, 305-C, 305-D, and 305-F to create eight output channels 345. In a second embodiment, the photonic circuit 310 can be implemented using lasers 305-B and laser 305-E to create eight output channels 345.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. An apparatus, comprising:
a photonic integrated circuit (PIC) comprising:
a semiconductor substrate;
an optical interconnect comprising
V optical parallel output channels; and
U optical laser input ports,
wherein a selectable subset of the U optical input ports are selectable for a first use case and connected to L lasers, wherein L is less than or equal to U, and
wherein the PIC is operable to output light on some or all of the V optical output channels in response to a different number of active lasers connected to the U optical laser input ports, wherein the optical interconnect comprises W optical elements, wherein each of the W optical elements comprises at least two optical output channels, wherein each of the U optical laser input ports is in optical communication with at least two of the V optical output channels, wherein V is greater than U, wherein each of the W optical elements are formed in or on a portion of the semiconductor substrate, wherein L is one or more lasers, wherein at least three W optical elements in the PIC are in optical communication in a Y-shaped topology, wherein W is greater than or equal to three, wherein at least two of the W optical elements are four port devices, wherein at least one of the W optical elements is a three port device, and wherein one of the W optical elements is an active optical splitter having an adjustable splitting ratio.

2. The apparatus of claim 1, wherein the W optical elements are optical signal distributors selected from a group consisting of optical splitter, active optical splitter, passive optical splitter, optical coupler, optical multiplex, and optical circulator.

3. The apparatus of claim 1, wherein the W optical elements comprise a first optical element comprising a single optical input; a second optical element comprising two optical inputs; and third optical element comprising two optical inputs.

4. The apparatus of claim 1, where V is 4, and L is 1 or 2.

5. The apparatus of claim 1, where V is 8, and L is 1, 2 or 4.

6. The apparatus of claim 1, wherein the optical interconnect comprises a plurality of 1×2 optical splitter and a plurality of 2×2 optical splitters.

7. The apparatus of claim 1, wherein the optical interconnect comprises passive and/or active optical splitters.

8. The apparatus of claim 1, wherein the PIC comprises V modulators, wherein each of the V modulators is connected to one of the V output channels.

9. The apparatus of claim 1 further comprising one or more lasers, wherein each of the one or more lasers is connected to only one of the U optical input channels.

10. The apparatus of claim 1, wherein U is 3 and V is 4.

11. The apparatus of claim 1, wherein U is 6 and V is 8.

12. The apparatus of claim 1 wherein the L lasers are selected to mitigate splitting losses from the optical interconnect splitting light received at the U optical laser input ports.

13. The apparatus of claim 1, wherein the selectable subset of the U optical input ports are selectable for a second use case and connected to L lasers.

14. The apparatus of claim 13, wherein the first use case is configured such that V is 4 and each output channel is configured to use 4-levels of pulse amplitude module.

15. The apparatus of claim 13, wherein the selectable subset of the U optical input ports are selectable for a third use case and connected to L lasers, wherein U is 4.

16. The apparatus of claim 15, wherein the first use case is one or more transmitters with four lasers and four parallel channels, wherein one laser is used for each channel, wherein each laser is in optical communication with one optical input port, wherein for the second use case L is 2, and wherein for the third use case L is 1.

17. A method of using an optical interconnect that has V optical parallel output channels, U optical laser input ports, and a selectable subset of the U optical laser input ports can be connected to a variable number L of lasers to provide optical power to V optical output channels, the method comprising:
determining the number L of lasers to be used;
select a subset of user selectable L optical laser input ports from the U optical laser input ports that map the L lasers to the V output channels, wherein V is greater than U, wherein the L optical laser input ports are selectable for a first use case;
connect the L lasers to a subset of the L optical laser input ports;
splitting light from at least one of the L lasers using a first optical splitter;
splitting light exiting the first optical splitter using a second optical splitter or a third optical splitter, wherein the first optical splitter, the second optical splitter, and the third optical splitter are in optical communication in a Y-shaped topology;
modulating, using a modulation format, the light exiting the second optical splitter, wherein the L optical laser input ports, the first optical splitter, and the second optical splitter are integrated in a photonic integrated circuit, wherein L is one or more lasers, wherein one or more of the optical splitters is an active optical splitter; and
controlling one or more of the active optical splitters using a control element to adjust a splitting ratio of the one or more active optical splitters.

18. The method of claim 17, wherein the modulation format is pulse amplitude modulation.

19. The method of claim 17, wherein two of the optical splitters are four port devices, wherein one of the optical splitters is a three port device.

20. The method of claim 17, wherein the first use case is configured such that V is 4 and each output channel is configured to use 4-levels of pulse amplitude module.

* * * * *